United States Patent
Hesse et al.

(10) Patent No.: US 11,625,793 B1
(45) Date of Patent: Apr. 11, 2023

(54) PROCESS FOR ESTIMATING CROP YIELD

(71) Applicants: Meyer Colpien Hesse, Visalia, CA (US); Travis William Hesse, Visalia, CA (US)

(72) Inventors: Meyer Colpien Hesse, Visalia, CA (US); Travis William Hesse, Visalia, CA (US)

( * ) Notice: Subject to any disclaimer, the term of this patent is extended or adjusted under 35 U.S.C. 154(b) by 68 days.

(21) Appl. No.: 17/193,778

(22) Filed: Mar. 5, 2021

Related U.S. Application Data

(60) Provisional application No. 62/985,798, filed on Mar. 5, 2020.

(51) Int. Cl.
| | |
|---|---|
| *G06Q 50/02* | (2012.01) |
| *A01D 46/00* | (2006.01) |
| *G06Q 30/02* | (2012.01) |
| *H04N 5/33* | (2006.01) |
| *G06T 11/60* | (2006.01) |
| *G06V 20/10* | (2022.01) |
| *G06Q 30/0283* | (2023.01) |

(52) U.S. Cl.
CPC ............ *G06Q 50/02* (2013.01); *A01D 46/00* (2013.01); *G06Q 30/0283* (2013.01); *G06T 11/60* (2013.01); *G06V 20/188* (2022.01); *H04N 5/332* (2013.01); *G06T 2200/24* (2013.01)

(58) Field of Classification Search
CPC .... G06Q 50/02; G06Q 30/0283; A01D 46/00; G06T 11/60; G06T 2200/24; G06V 20/188; H04N 5/332
See application file for complete search history.

(56) References Cited

U.S. PATENT DOCUMENTS

| | | | |
|---|---|---|---|
| 2015/0022656 A1* | 1/2015 | Carr | G06V 20/13 348/117 |
| 2018/0259496 A1* | 9/2018 | McPeek | G01N 33/025 |
| 2020/0272971 A1* | 8/2020 | Ruff | G06Q 50/02 |

* cited by examiner

*Primary Examiner* — Jennifer Mehmood
*Assistant Examiner* — Andrew Shin
(74) *Attorney, Agent, or Firm* — Plager Schack LLP; Mark H. Plager; Michael J. O'Brien

(57) ABSTRACT

A process for estimating a value of a crop of walnuts prior to harvest includes the following steps which are not necessarily in order. First, arranging an unmanned aerial vehicle with a digital single-lens reflex high speed multi spectral camera fitted with a near-infrared filter. Then, taking normalized difference vegetation index images of a field of walnuts every second at a clarity of two centimeters in detail from an altitude of four hundred feet. Next, forming a map of the field from the normalized difference vegetation index images. After that, determining a ratio of the field which possesses a high near-infrared profile. Following that, calculating a meat yield as a product of the ratio and the maximum walnut grade in the field. Finally, calculating the value of the crop from the meat yield.

3 Claims, 4 Drawing Sheets

PROCESS FOR ESTIMATING CROP YIELD

RELATED APPLICATION

This application claims priority to provisional patent application U.S. Ser. No. 62/985,798 filed on Mar. 5, 2020, the entire contents of which is herein incorporated by reference.

BACKGROUND

The embodiments herein relate generally to systems that are useful in horticulture.

Prior to embodiments of the disclosed invention, it was difficult to estimate crop value prior to harvest. There were several aspects of this difficulty. First, historical patterns did little to account for present day conditions. Second, there was no way to readily obtain real time information for crop yield estimation. Third, there was no way to effectively communicate this real time information.

Embodiments of the disclosed invention solve these problems and others.

SUMMARY

A process for estimating a value of a crop of walnuts prior to harvest includes the following steps which are not necessarily in order. First, arranging an unmanned aerial vehicle with a digital single-lens reflex high speed multi spectral camera fitted with a near-infrared filter. Then, taking normalized difference vegetation index images of a field of walnuts every second at a clarity of two centimeters in detail from an altitude of four hundred feet. Next, forming a map of the field from the normalized difference vegetation index images. After that, determining a ratio of the field which possesses a high near-infrared profile. Following that, calculating a meat yield as a product of the ratio and the maximum walnut grade in the field. Finally, calculating the value of the crop from the meat yield.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
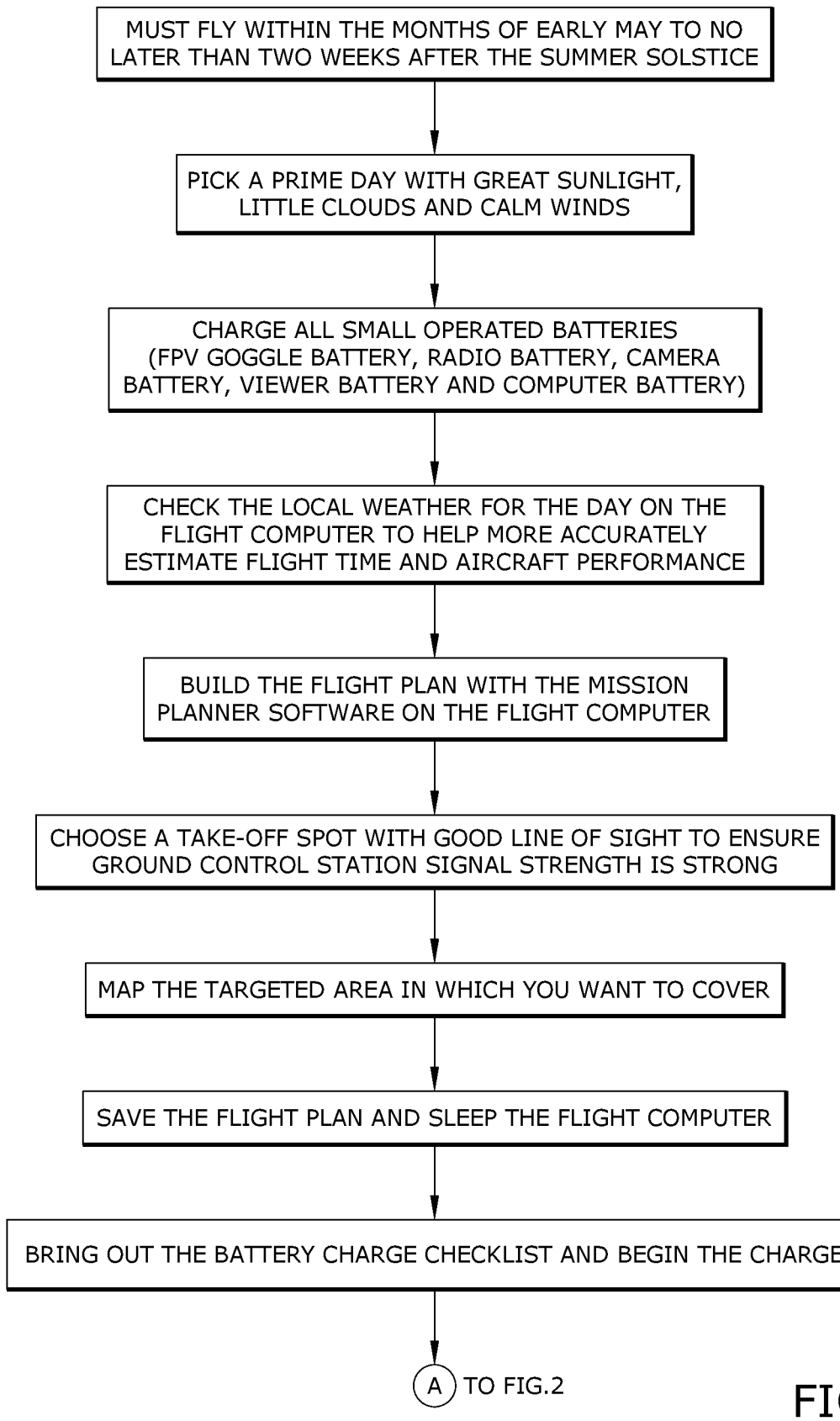
FIG. 1 shows a schematic view of one embodiment of the present invention.
Figure 2:
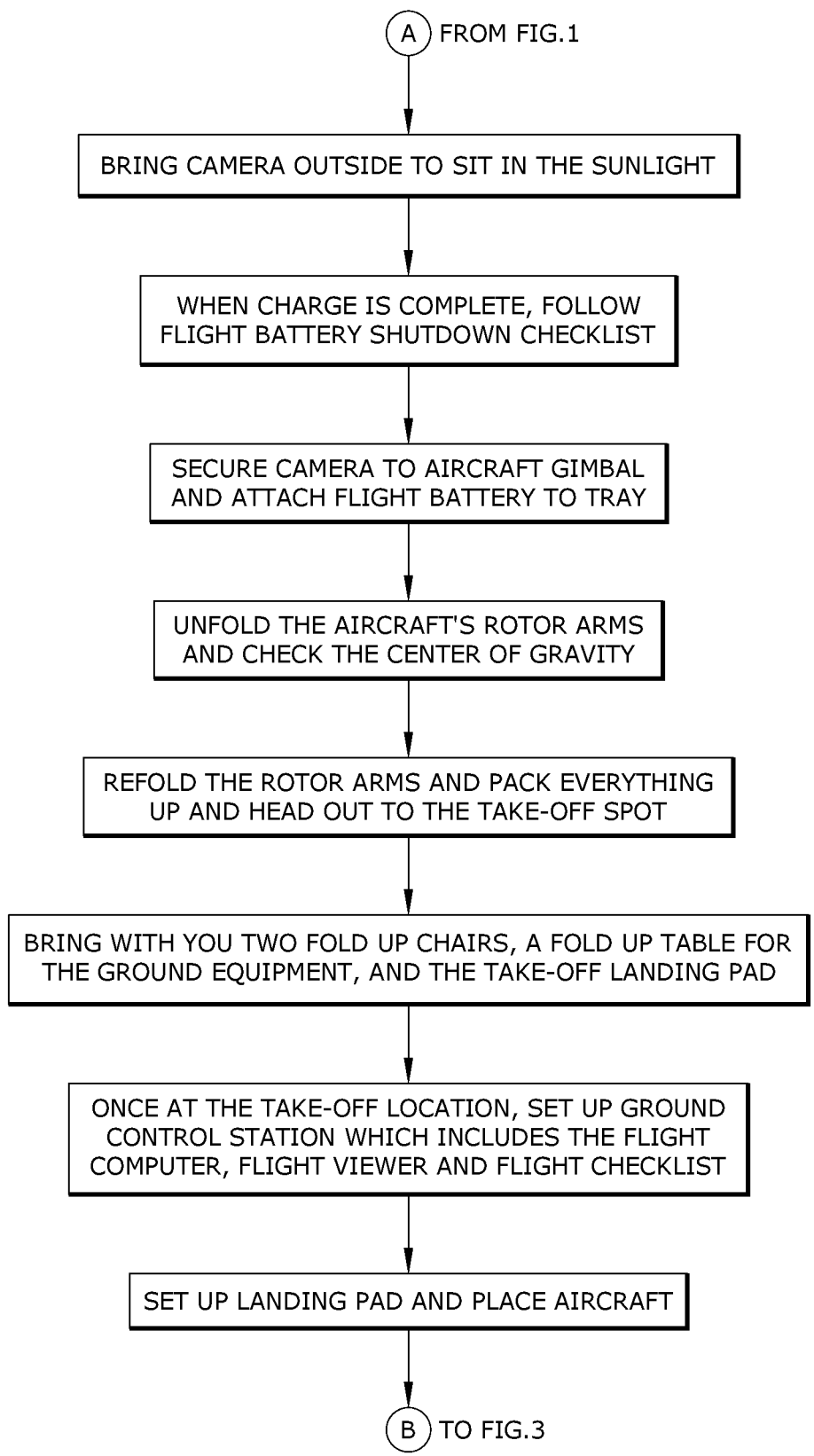
FIG. 2 shows a schematic view of one embodiment of the present invention.
Figure 3:
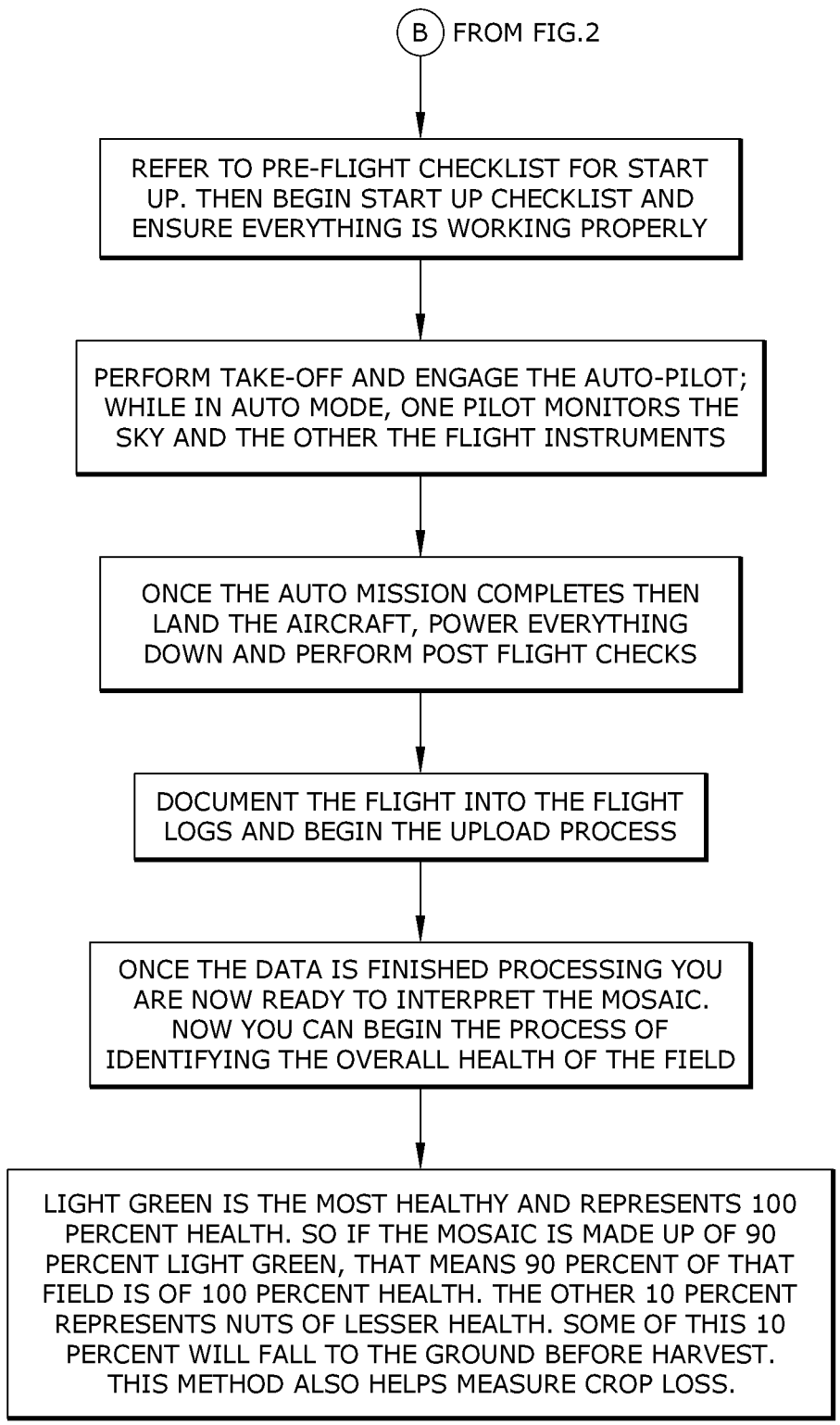
FIG. 3 shows a schematic view of one embodiment of the present invention.

By way of example, and referring to FIGS. 1-3, one embodiment of the present process includes the following steps. A user can fly the unmanned aerial vehicle between May 1 and July 29. The precise day requires great sunlight, little clouds and calm winds. The user can charge the small operated batteries including the first-person view (FPV) goggles, the radio, the camera, the viewer battery and the flight computer battery.

The user can check the local weather for the day on the flight computer to help more accurately estimate flight time and aircraft performance. Next, the user can build a flight plan with mission planning software on the flight computer. Following that the user can choose a take-off spot with good line of sight to ensure a ground control station signal strength is strong. After this, the user can map the targeted are that the user wants to cover. The user can next save the flight plan and sleep the flight computer. Subsequently, the user can bring out a battery charge checklist and begin to charge the battery.

The user can next bring the camera outside to sit in the sunlight. When the charge is complete, the user can follow the flight battery shutdown list. After this, the user can secure the camera to the aircraft gimbal and attach the flight batter to a tray. The user can then unfold the aircraft's rotor arms and check a center of gravity of the aircraft. The user can refold the rotor arms, pack everything up and head out to the take-off spot. The user can bring two fold-up chairs, a fold up table for ground equipment, and a take-off landing pad. Once at the take-off location, the user can set up a ground control station which includes a flight computer, flight viewer, and flight checklist. The user can then set up the landing pad and place the aircraft.

The user can next refer to the preflight checklist for start up and then begin the start up checklist to ensure the equipment is working properly. The user can perform takeoff and engage the auto-pilot. While in auto pilot, one pilot monitors the skey and the other pilot monitors the flight instruments. Once the auto mission completes, the user can land the aircraft, power the equipment down and perform post flight checks.

Turning to this process in more detail, this process involves manual pilot and a flight director. They use a multi rotor unmanned aerial vehicle (UAV) to fly over walnut farmland. The most important piece of our equipment is our censor, which is a DSLR high speed multi spectral camera that has been fitted with a near-infrared (NIR) filter, capable of taking a photo every second at a clarity of two centimeters in detail from an altitude of 400 feet. Flights are done between the hours of 10 am to 2 pm for optimal light. The goal is to fly over these fields when the trees are at their peak health which is in the summer time from the first of May to the 2nd week of July. The time of year is just as important as the time of day to receive the most optimal light to make the data interpretation very accurate. The NIR NDVI (normalized difference vegetation index) images taken from the multi rotor are sent off and processed by a team of certified professionals that specialize in NDVI data processing. The data is interpreted based upon how much of the field is of High NIR signature. For example, a field of 90 percent health means that 90 percent of that field has a high NIR signature. This also means that that field is functioning at a level of 90 percent of capacity. From here meat yield can be calculated.

The user can next document the flight into flight logs and begin an upload process. Once the data is finished processing, the user can next interpret a mosaic. The user can then begin the process of identifying the overall health of the field.

The walnut grade is determined by its variety. The most common is the chandler variety of walnut, which is graded out of 47. So, the highest grade represents their highest quality of nut. To then calculate the meat yield multiply capacity and yield. 42.3 is the meat yield. Since environmental conditions and farming practices are the main two influences of plant health then only one field of each variety of each ranch is needed to give a meat yield assessment. This means little land is needed to give a meat yield assessment. This will allow users to fly over several different ranches in the summer time months. And since every farmer has their own unique strategies, meat yield assessments will be fairly close but slightly different from ranch to ranch. quantity can also be estimated. Just like with calculating meat yield, you need a maximum, which is the maximum grade. For quantity one needs a maximum weight meaning the amount that was kept and shipped. The farmer should be able to know his best record year easily meaning the most kept. That number will stand for a 100 percent health rating (a very high meat yield). maximum weight means tons per acre. For example, if 2.2 tons per acre was the maximum weight that the farmer ever had on record, then take the heath assessment, for example, 90 percent, and multiply it by 2.2 which comes out to 1.98 tons per acre, then multiply the 1.98 tons per acre by the amount of acres in that field. That gives a total weight in tons. Both estimates are done in the same way using maximums and can be calculated at the same time in early summer to late spring before the crop is visible To be clear, every load of walnuts that is shipped out for processing, 100 randomly chosen nuts are examined from each load for quality and graded on the scale we mentioned earlier. They then average the total grades from each load giving them the final meat yield. Which is what the grower is paid upon. It is this final meat yield that we can see in the summer time, many months prior to harvesting. The point can be summed up by these two simple questions. During harvest the processors evaluate the quality of the nuts. Summertime flights evaluate the health "quality" of the trees. The health "quality" of the trees reveals the quality of the nuts come harvest time.

Figure 4:
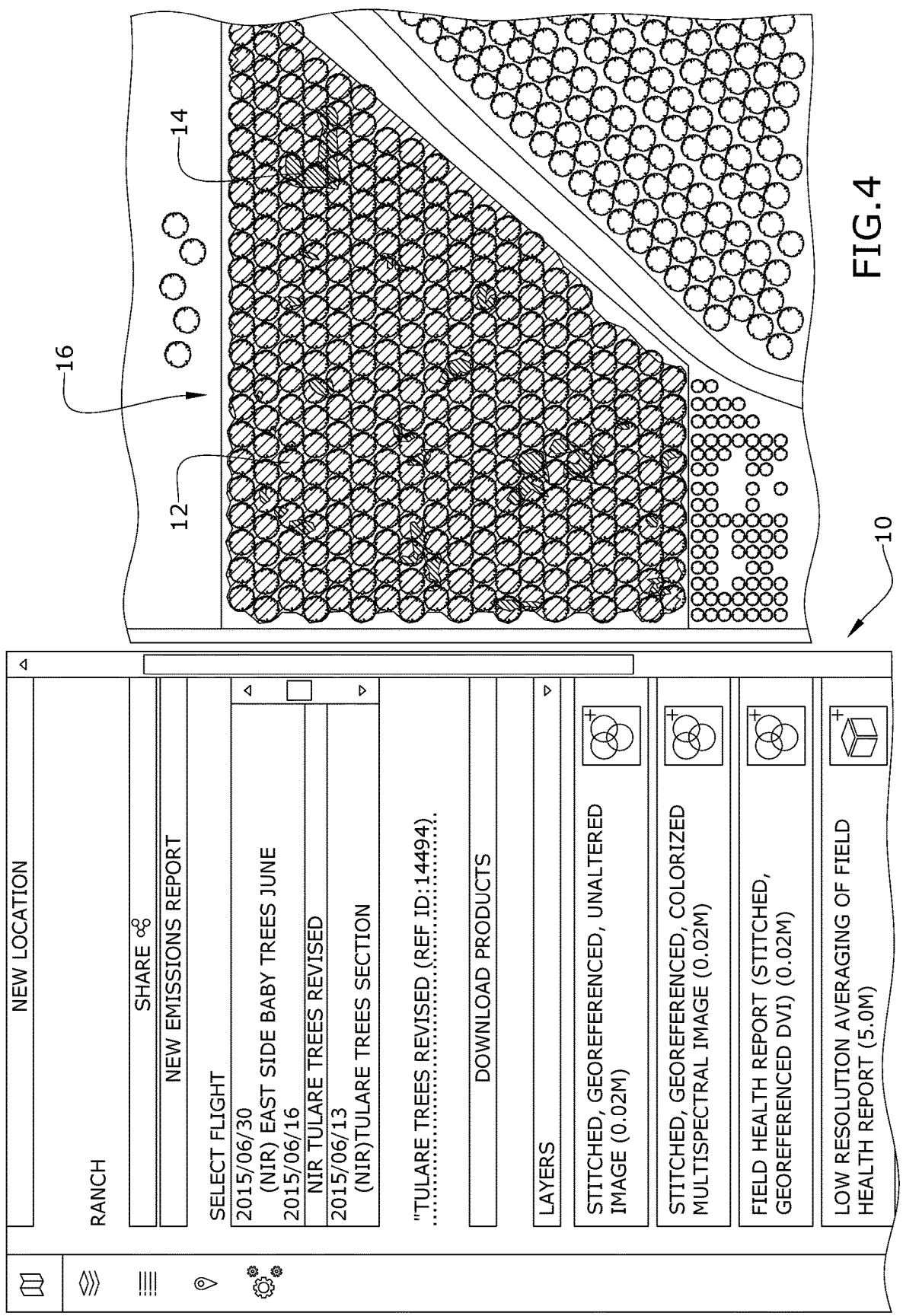
FIG. 4 shows a user interface of one embodiment of the present invention.

A user interface, as made by this process is shown in FIG. 4. The NIR NDVI takes each photograph and segregates each tree into most healthy trees 12 and less healthy trees 14 based on each trees NIR profile. The most healthy trees 12 and less healthy trees 14 are amalgamated onto a mosaic imagery 16 that forms the mosaic data layers 10.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶ 6. In particular, any use of "step of" in the claims is not intended to invoke the provision of 35 U.S.C. § 112, ¶ 6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A process for estimating a value of a crop of walnuts prior to harvest; the process comprising:
   arranging an unmanned aerial vehicle with a digital single-lens reflex high speed multi spectral camera fitted with a near-infrared filter and a processor;
   taking normalized difference vegetation index images of a field of walnuts every second at a clarity of two centimeters from an altitude of four hundred feet with the spectral camera;
   forming a map of the field from the normalized difference vegetation index images with the processor;
   determining a ratio of the field which possesses a high near-infrared profile with the processor;
   calculating a meat yield as a product of the ratio and the maximum walnut grade in the field with the processor; and
   calculating the value of the crop from the meat yield with the processor.

2. The process of claim 1, further comprising:
   arranging the map onto a user interface showing most healthy trees and less healthy trees based on each tree's near infrared signature with the processor.

3. The process of claim 2, further comprising:
   overlapping the most healthy trees and the less healthy trees on the user interface using mosaic data layers with the processor.

* * * * *